United States Patent
Ellä et al.

(10) Patent No.: US 7,251,499 B2
(45) Date of Patent: Jul. 31, 2007

(54) METHOD AND DEVICE FOR SELECTING BETWEEN INTERNAL AND EXTERNAL ANTENNAS

(75) Inventors: Juha Ellä, Halikko (FI); Ilkka Tarmo Kojola, deceased, late of Salo (FI); by Raija Virpi Irmeli Kojola, legal representative, Salo (FI)

(73) Assignee: Nokia Corporation, Espoo (FI)

( * ) Notice: Subject to any disclaimer, the term of this patent is extended or adjusted under 35 U.S.C. 154(b) by 508 days.

(21) Appl. No.: 10/871,791

(22) Filed: Jun. 18, 2004

(65) Prior Publication Data

US 2006/0079275 A1    Apr. 13, 2006

(51) Int. Cl.
*H04Q 7/20*    (2006.01)
(52) U.S. Cl. ................. 455/552.1; 455/101; 455/553.1; 343/893
(58) Field of Classification Search ................. 455/101, 455/552.1, 553.1; 343/893
See application file for complete search history.

(56) References Cited

U.S. PATENT DOCUMENTS 6,021,317 A * 2/2000 Irvin ........................... 455/78
6,574,460 B1 * 6/2003 Lindenmeier et al. ... 455/277.1
2002/0086650 A1 * 7/2002 Haapoja ..................... 455/120

FOREIGN PATENT DOCUMENTS

| EP | 0823751 A2 | 2/1998 |
| EP | 1511184 A1 | 3/2005 |
| JP | 2004007727 A | 8/2004 |

* cited by examiner

*Primary Examiner*—Temica Beamer
(74) *Attorney, Agent, or Firm*—Ware, Fressola, Van Der Sluys & Adolphson, LLP

(57) ABSTRACT

In an RF front-end having a plurality of signal paths connectable to an internal antenna or an external antenna, an antenna switch part is used to select either the internal or the external antenna. In the antenna switch part, two series switches are used to operatively connect to the same connection point in each signal path. These two series switches are separately connected to two different antennas for selecting one of the antennas in order to route the signals in that signal path. For providing further isolation between signal paths, each signal path can be connected to a shunt switch near the connection point. Only the shunt switch connected to the selected signal path is operated in an open position, all the other shunt switches are operated in a closed position.

22 Claims, 10 Drawing Sheets

METHOD AND DEVICE FOR SELECTING BETWEEN INTERNAL AND EXTERNAL ANTENNAS

FIELD OF THE INVENTION

The present invention relates generally to RF front-end arrangement of a mobile phone and, more particularly, to the switching arrangement in a mobile phone front-end.

BACKGROUND OF THE INVENTION

When a mobile phone is operable in many different frequency bands, such as GSM and W-CDMA bands, the RF front-end of the mobile phone generally has a plurality of switches for selecting among those bands. For example, a mobile phone is operable in a plurality of GSM bands and one W-CDMA band, it has two antennas: one GSM antenna 10 and one W-CDMA antenna 12, as shown in FIG. 1a. The front-end module 1 includes an antenna switch 20 having a plurality of series switches 22, 24, 26 and 28 operatively connected to the GSM signal paths 32, 34, 36, and 38 so as to allow the GSM signals to be routed through the GSM antenna 10 through a common node 29. In addition, a duplexer 40 having a bandpass filter 42 and a bandpass filter 44 operatively connected to the W-CDMA signal paths 52, 54 so as to allow the W-CDMA signals to be routed through the W-CDMA antenna 12. Each of the switches 22, 24, 26 and 28 in the antenna switch 20 serves as a path selection component that must be operated in an "ON" state or an "OFF" state for path selection purposes. The bandpass filters 42 and 44 can also be considered as path selection components, but they do not need to be operated in the "OFF" state for band rejection. Unlike a shunt switch, each of these path selection components is a series component, which is connected in series with other RF-front end components such as amplifiers, filters (not shown) along the same signal path. In practice, the multimode, multiband RF front-end is substantially like that shown in FIG. 1b. The front-end typically comprises a plurality of bandpass filters (such as filter 332), baluns (such as balun 432), matching elements (such as inductive element 836 and capacitive element 834) and phase-shifters (such as shifters 725, 734, 752). In addition, the RF front-end comprises a diplexer 920 with harmonic filters for GSM Tx. For GSM Tx-Rx switching, the actual implementation for each switching function would have at least one series switching element and one shunt element. The switching elements can be FETs such as CMOS devices, or p-HEMTs such as GaAs devices, or the like. In case of diodes being used as switches, one or more 90 degree phase shifters are also used.

As shown in FIG. 1b, For GSM Tx-Rx switching, two series diodes 526, 528, two shunt diodes 624, 626 and two phase-shifters 725 and 734 are used. If FETs are used as switching elements, as shown in FIG. 1c, any one of the paths can be selected by biasing the appropriate series switch "ON" (here the second path is selected). Only the shunt switch in the selected path is "OFF", while all remaining shunt switches are "ON" in order to increase isolation with respect to the selected path.

The antennas 10 and 20 as shown in FIG. 1a are herein referred to as internal antennas of the mobile phone because they usually come with the mobile phone. In the example of FIG. 1a, the antenna switch 20 is used for selecting the signal paths among two different GSM bands. In many cases, the antenna switch must be used for selecting the signal paths among four different GSM bands at 850, 900, 1800 and 1900 MHz.

When the mobile phone is used in connection with an external antenna, such as when the mobile phone is so configured that it can be used to receive and transmit signals through one or more automobile antennas, additional switches are required. As shown in FIG. 2, two additional switches 62, 64, which are separately connected in series with the switches 22, 24, 26 and 28, are used for selecting the signal paths between the internal antenna 10 and the external antenna 14 through the common node 29. Likewise, two additional switches 66, 68, which are separately connected in series with the bandpass filters 42, 44, are used for selecting the signal paths between the internal antenna 12 and the external antenna 14. As with the internal switches 22, 24, 26 and 28, each of the additional switches 62, 64, 66 and 68 is also a path selection component that is operable in an "ON" state and an "OFF" state. Thus, in the switch arrangement as shown in FIG. 2, each of the signal paths 32, 34, 36 and 38 has two series path selection components, each operable in an "ON" state and an "OFF" state, regardless of which of the antennas 10 and 14 is being used for signal reception and transmission. For example, if the path between the external antenna and the GSM Rx1 path is selected, the receive signals must pass through two path selection components connected in series: switch 64 and 22. Putting an additional path selection component in the signal path introduces additional losses. The losses are especially critical in the W-CDMA case. It should be noted that the switches as shown in FIGS. 1 and 2 are typically solid-state switches such as PIN diodes, GaAs p-HEMTs (pseudomorphic High Electron Mobility Transistors), for example. The losses associated with these types of solid-state switches are generally quite significant. Although one could use mechanical switches to reduce the losses, the size of mechanical switches renders their usage impractical.

It is desirable and advantageous to provide a method and device for selecting signal paths between internal and external antennas so that the losses can be avoided or minimized.

SUMMARY OF THE INVENTION

The present invention uses an antenna switch part in which two series path selection components or switches are used to operatively connect to the same connection point in each signal path. These two series switches are separately connected to two different antennas for selecting one of the antennas in order to route the signals in that signal path. In effect, the two switches for each signal path are connected in parallel. In a mobile terminal that has N signal paths, 2N series switches are used to select the antennas as well as the signal paths. However, where the frequency range difference between two signal paths are small such that bandpass filters or phase shifters can be used for path selections, the number of series switches can be reduced.

Thus, the first aspect of the present invention provides an antenna switch part for use in conjunction with an RF front-end of a communications device, wherein the front-end has a plurality of signal paths for conveying signals in a plurality of frequency bands through a first antenna or a second antenna, the frequency bands including at least one GSM transmit frequency band and one GSM receive frequency band. The antenna switch part comprises:

a plurality of first switching elements, each switching element having a first end a second end, the first switching elements operable in an open position for electrically isolating the first end from the second end and in a closed position for electrically connecting the first end to the second end, the first end operatively connected to the first antenna, the second end operatively connected to a different one of the signal paths; and a plurality of second switching elements, each switching element having a first end and a second end, the second switching elements operable in an open position for electrically isolating the first end from the second end and in a closed position for electrically connecting the first end and the second end, the first end operatively connected to the second antenna, the second end operatively connected to the second end of a different one of the first switching elements, so that the signals in one of the plurality of signal paths can be routed through the first or the second antenna when the first or the second switching element connected to said one signal path is operated in the closed position.

According to the present invention, the frequency bands also include one further GSM transmit frequency band and one further GSM receive frequency band.

According to the present invention, the front-end further has a further signal path for conveying signals in a code-division multiple access frequency band through either the second antenna or a third antenna, and the antenna switch part further comprises:

a third switching element having a first end and a second end, the third switching element operable in an open position or a closed position, the first end operatively connected to the third antenna and the second end operatively connected to the further signal path, wherein the further signal path is also operatively connected to the second end of a different one of the second switching elements.

According to the present invention, the code-division multiple access frequency band comprises a W-CDMA frequency band.

According to the present invention, the antenna switch part further comprises one or more shunt switches, each shunt switch having a first end connected a different one of the signal paths, and a second end connected to a circuit ground, each shunt switch operable in a closed position or an open position, wherein the shunt switch, if any, connected to said one signal path is operated in the open position.

Alternatively, the antenna switch part further comprises a plurality shunt switches, each shunt switch having a first end connected a different one of the signal paths, and a second end connected to a circuit ground, each shunt switch operable in a closed position or an open position, wherein the shunt switch connected to said one signal path is operated in the open position and wherein the shunt switch connected to each of the other signal paths is operated in the closed position.

The second aspect of the present invention provides a method for selecting a signal path among a plurality of signal paths in an RF front-end of a communications device, wherein the communications device comprises a first antenna and a second antenna, and wherein the signal paths are used to convey signals in a plurality of frequency bands through the first antenna or the second antenna, the frequency bands including at least one GSM transmit frequency band and one GSM receive frequency band. The method comprises:

providing a plurality of first switching elements, each first switching element having a first end a second end, the first switching elements operable in an open position for electrically isolating the first end from the second end and in a closed position for electrically connecting the first end to the second end, the first end operatively connected to the first antenna, the second end operatively connected to a different one of the signal paths;

providing a plurality of second switching elements, each second switching element having a first end and a second end, the second switching elements operable in an open position for electrically isolating the first end from the second end and in a closed position for electrically connecting the first end and the second end, the first end operatively connected to the second antenna, the second end operatively connected to the second end of a different one of the first switching elements; and causing either the first or the second switching element connected to the selected signal path to operate in the closed position for routing the signals in the selected signal path through the first antenna or the second antenna.

According to the present invention, the communications device further comprises a third antenna, and the front-end further has a further signal path for conveying signals in a code-division multiple access frequency band through either the second antenna or the third antenna. The method further comprises:

providing a third switching element having a first end and a second end, the third switching element operable in an open position or a closed position, the first end operatively connected to the third antenna and the second end operatively connected to the further signal path, wherein the further signal path is also operatively connected to the second end of a different one of the second switching elements; and causing the third switching element to operate in the closed position for routing the signals in the further signal path through the third antenna.

According to the present invention, the selected signal path is also used for conveying signals in the code-division multiple access frequency band, and the first switching element connected to the selected signal path is caused to operate in the closed position so as to route the signals in the code-division multiple access frequency band also through the first antenna to achieve receive diversity.

The third aspect of the present invention provides a communications device, comprising:

an RF front-end;

an antenna switch part;

a first antenna operatively connected to the RF front-end through the antenna switch part;

a connector to allow a second antenna to operatively connected to the RF front-end through the antenna switch part; wherein the front-end has a plurality of signal paths for conveying signals in a plurality of frequency bands through the first antenna or the second antenna, the frequency bands including at least one GSM transmit frequency band and one GSM receive frequency band, and wherein the antenna switch part comprises:

a plurality of first switching elements, each switching element having a first end a second end, the first switching elements operable in an open position for electrically isolating the first end from the second end and in a closed position for electrically connecting the first end to the second end, the first end operatively connected to the first antenna, the second end operatively connected to a different one of the signal paths; and a plurality of second switching elements, each switching element having a first end and a second end, the second switching elements operable in an open position for electrically isolating the first end from the second end and in a closed position for electrically connecting the first end and the second end, the first end operatively connected to the second antenna, the second end operatively connected to the second end of a different one of the first switching elements, so that the signals in one of the plurality of signal paths can be routed through the first or the second antenna when the first or the second switching element connected to said one signal path is operated in the closed position.

According to the present invention, the frequency bands also include one further GSM transmit frequency band and one further GSM receive frequency band.

According to the present invention, the communications device further comprises a third antenna operatively connected to the RF front-end through the antenna switch part, wherein the front-end further has a further signal path for conveying signals in a code-division multiple access frequency band through either the second antenna or a third antenna, and wherein the antenna switch part further comprises:

a third switching element having a first end and a second end, the third switching element operable in an open position or a closed position, the first end operatively connected to the third antenna and the second end operatively connected to the further signal path, wherein the further signal path is also operatively connected to the second end of a different one of the second switching elements.

The communications device can be a mobile terminal and the like.

The present invention will become apparent upon reading the description taken in conjunction with FIGS. 3a to 7.

DETAILED DESCRIPTION OF THE INVENTION

Figure 1A:
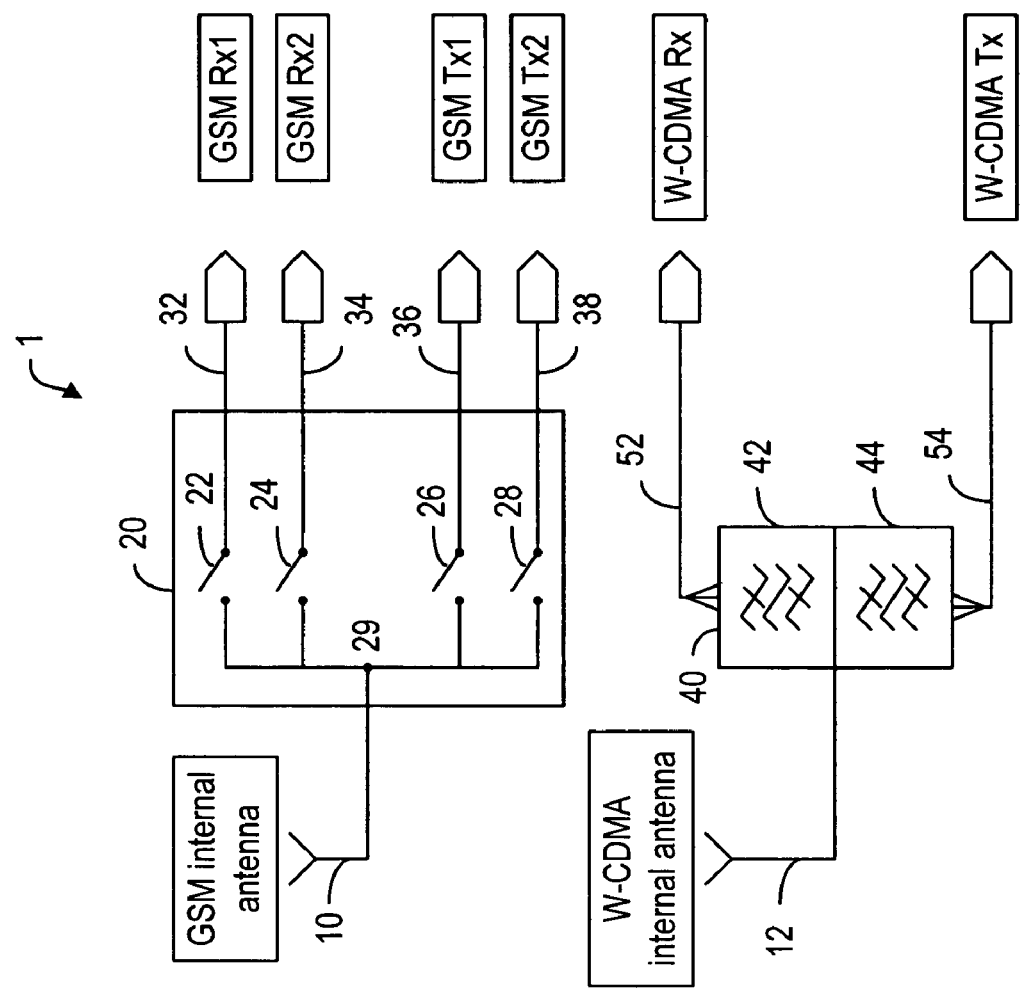
FIG. 1a is a schematic representation showing a simplified prior art communications device having two internal antennas.
Figure 1B:
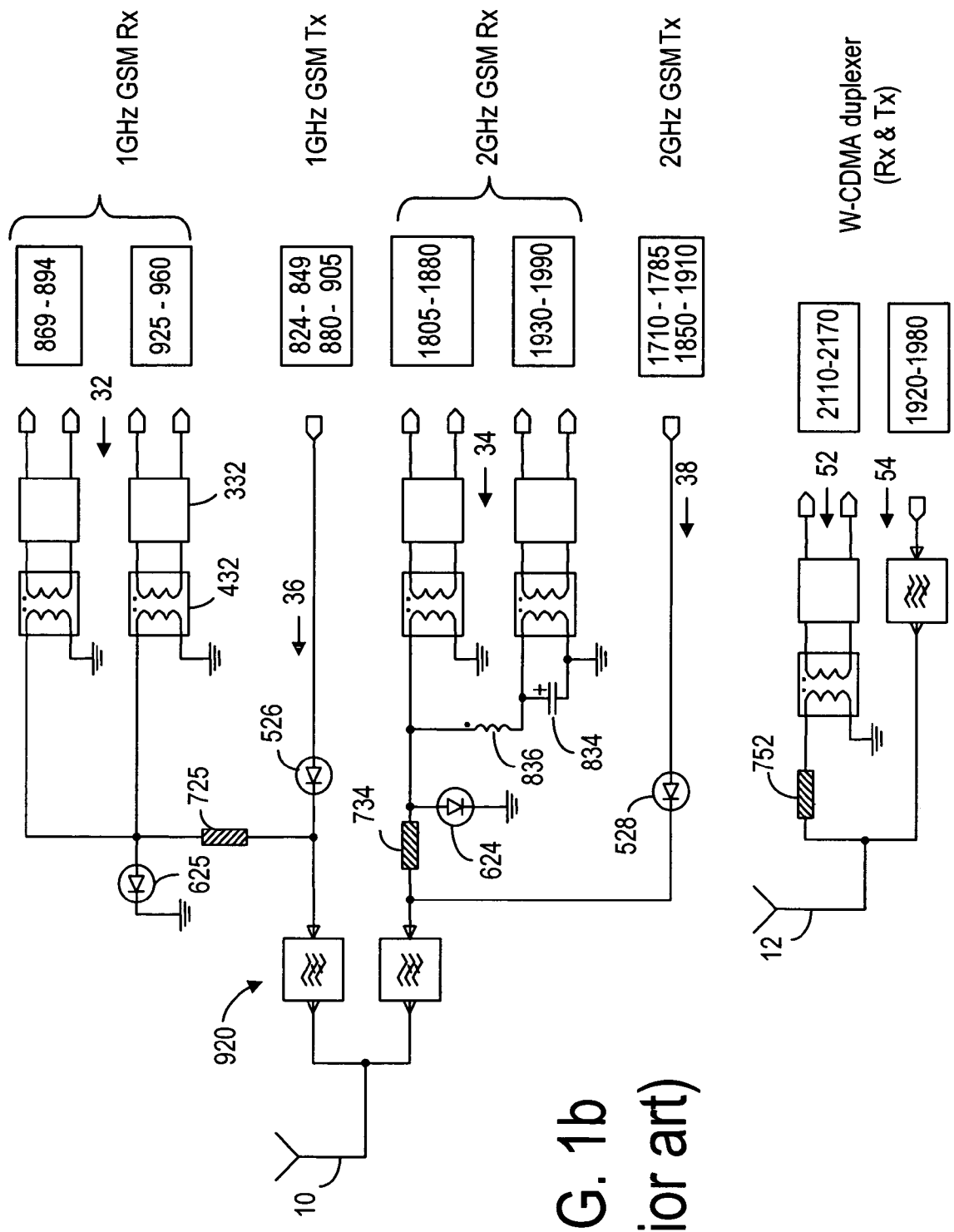
FIG. 1b is a circuit diagram of a practical prior art RF front-end for use in a communications device having two internal antennas.
Figure 3A:
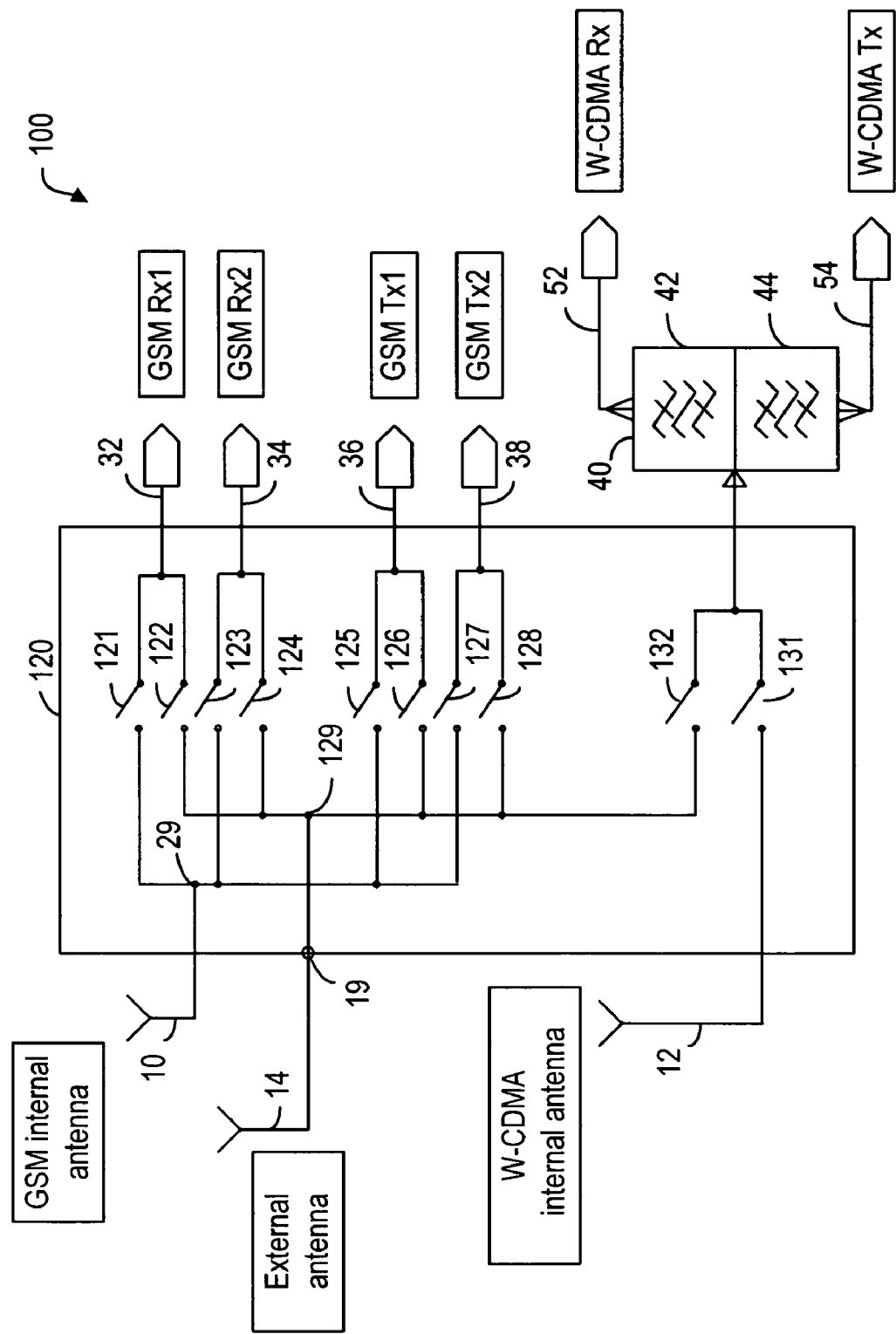
FIG. 3a is a schematic representation showing the switch arrangement for selecting between internal and external antennas, according to the present invention.

The present invention uses a pair of switching elements equivalent to a SP2T switch to connect to each transmit path and each receive path except where a transmit and receive path pair can be selected through bandpass filters and phase shifters. In the latter case, the transmit and receive path pair can share a SP2T switch. One of the switch elements in each SP2T switch arrangement is connected to an internal antenna and the other is connected to an external antenna. As shown in FIG. 3a, in addition to two internal antennas 10, 12, an external antenna 14 is also used for signal transmission and reception. In order to select between external and internal antennas, two series switches 121, 122 are connected to the signal path 32 in parallel. Likewise, each of the series switch pairs (123, 124), (125, 126) and (127, 128) is connected to one of the signal paths 34, 36 and 38 in parallel. The switch pair (131, 132) is connected to the duplexer 40. As in the prior art switch arrangement as shown in FIG. 1a, the switches 121, 123, 125 and 126 are connected to the internal GSM antenna 10 through the common node 29. The switch 131 is connected to the internal W-CDMA antenna 12. Because only one external antenna 14 is usable for transmission and reception, all other switches are connected to the external antenna 14 through a common node 129. The external antenna 14 is used for both GSM and W-CDMA modes. As can be seen in FIGS. 1a and 3a, the difference between the prior art front-end module 1 and the front-end module 100, according to the present invention, is the antenna switch part 20 and the antenna switch part 120. As with the prior art front-end module 1, the internal antenna 10 usually comes with the mobile phone and is already attached to the common node 29. Likewise, the internal antenna 12 is already attached to the antenna switch part 120. However, the external antenna 14 does not come with the mobile phone. The external antenna 14 can be an automobile antenna, for example. Thus, the external antenna 14 is usually required to be separately connected to the mobile phone. For example, the mobile phone can have a connector 19, which is operatively connected to the common node 129, so that an external antenna can be connected to the mobile phone if so desired.

Figure 3B:
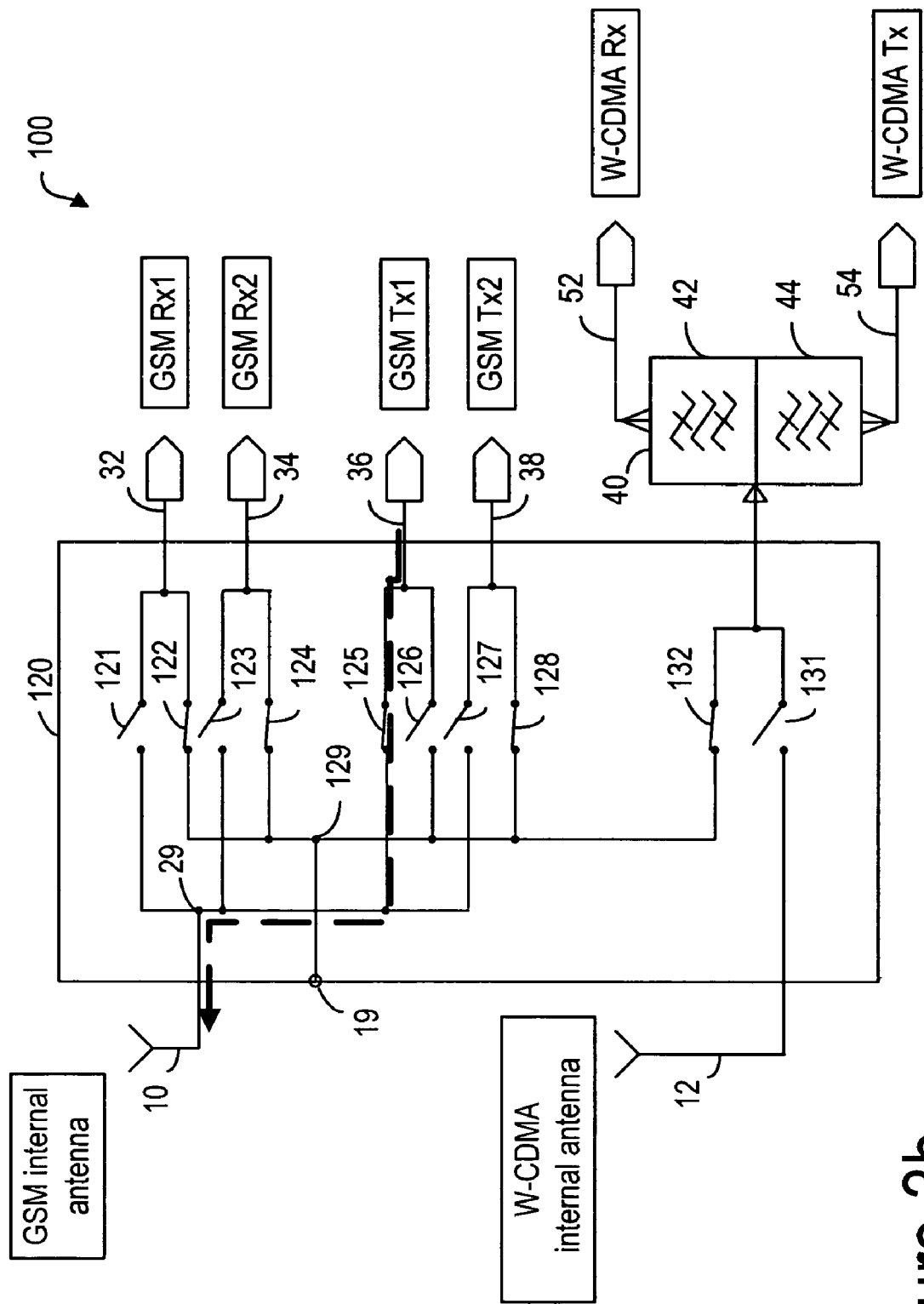
FIG. 3b is a schematic representation illustrating how a signal path is connected to the GSM antenna when the external antenna is not present.
Figure 3C:
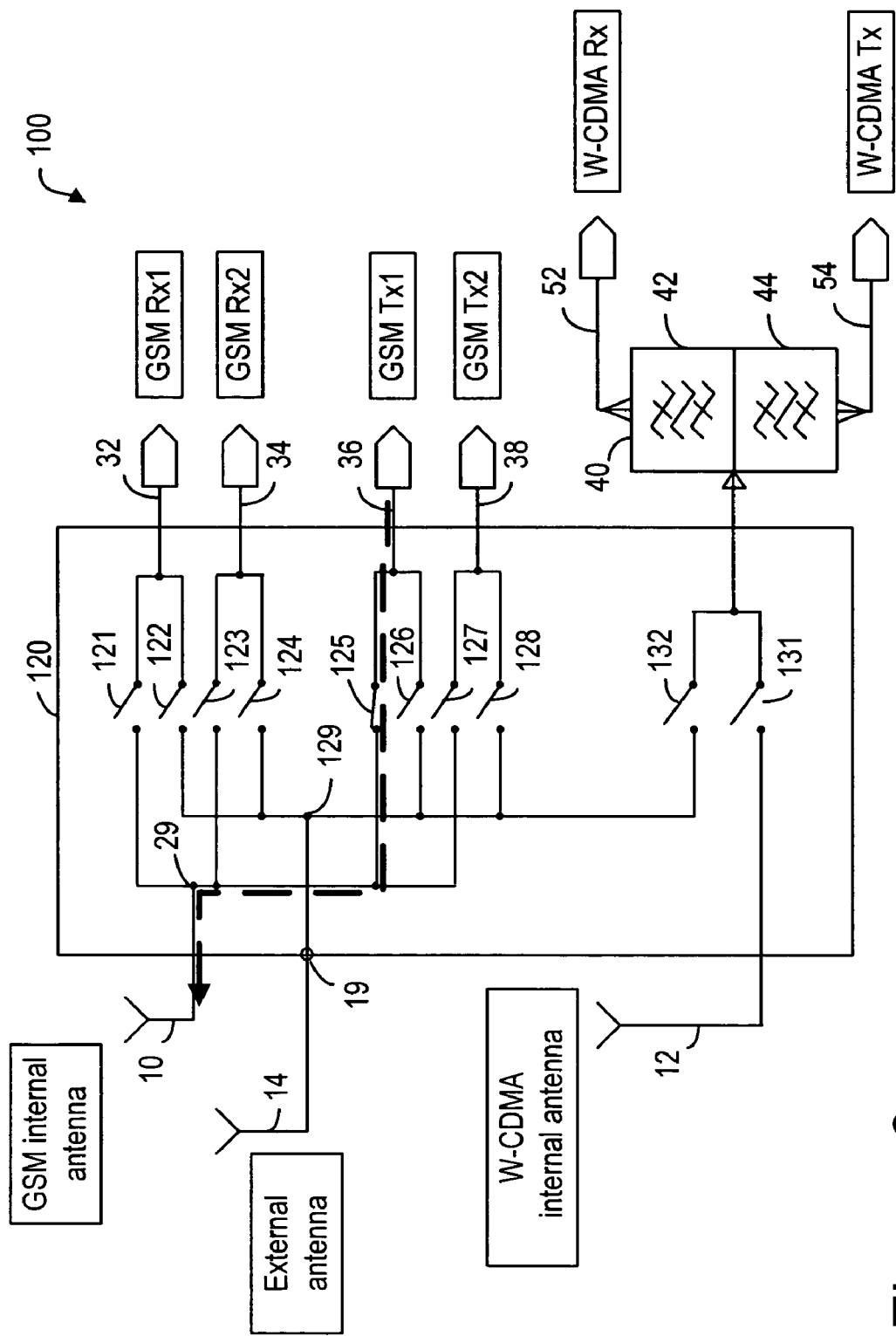
FIG. 3c is a schematic representation illustrating how a signal path is connected to the GSM antenna when the external antenna is present.

When the external antenna is not connected to the mobile phone, each of the SP2T switch pairs (121, 122), (123, 124), (125, 126), (127, 128) and (131, 132) can be biased such that one of the switches in each pair in "ON", while the other switch in the same pair is "OFF". As shown in FIG. 3b, the switches 121, 123, 126, 127 and 131 are biased to "OFF", while the switches 122, 124, 125, 128 and 132 are biased to "ON" so as to select the GSM Tx1 path. As such, the GSM transmit path 36 is operatively connected to the internal antenna 10. Although the switches 122, 124, 125, 128 and 132 are biased to "ON", the signal paths 32, 34, 38, 52, 54 are not selected because the external antenna 14 is not connected. But when the external antenna 14 is operatively connected to the antenna switch part 120, only the switch 125 is "ON" so that the GSM transmit path 36 is operatively connected to the internal antenna 10. All other switches are "OFF", as shown in FIG. 3c. If the external antenna 14 is selected for routing the signals in the GSM transmit path instead, only the switch 126 is "ON" and all other switches are "OFF". It should be noted that the path selection as shown in FIG. 3b is possible if the impedance seen at the node 19 appears as an open circuit. In practice, the switch module needs to be physically very close to the external antenna connector. Alternatively, appropriate phase shifting between the antenna connector and the switch module 120 need to be provided. The benefit of these features is the improvement in the isolation between the selected path and the non-selected paths.

It should be noted that the switches for use in connection with path selection as shown in FIGS. 3a and 3b or the like can be solid-state switches or even micro-electromechanical (MEM) switches, depending on the system requirements. Solid-state switches such as CMOS based (CMOS on SOI, for example) switches are a good candidate for path selection purposes. Unlike GaAS devices, CMOS devices do no require negative bias. Unlike PIN diodes that require physically large biasing elements to separate RF from DC, CMOS do not require large biasing elements. When the number of switch paths is large, the current consumption in PIN diodes may be too high.

Figure 4:
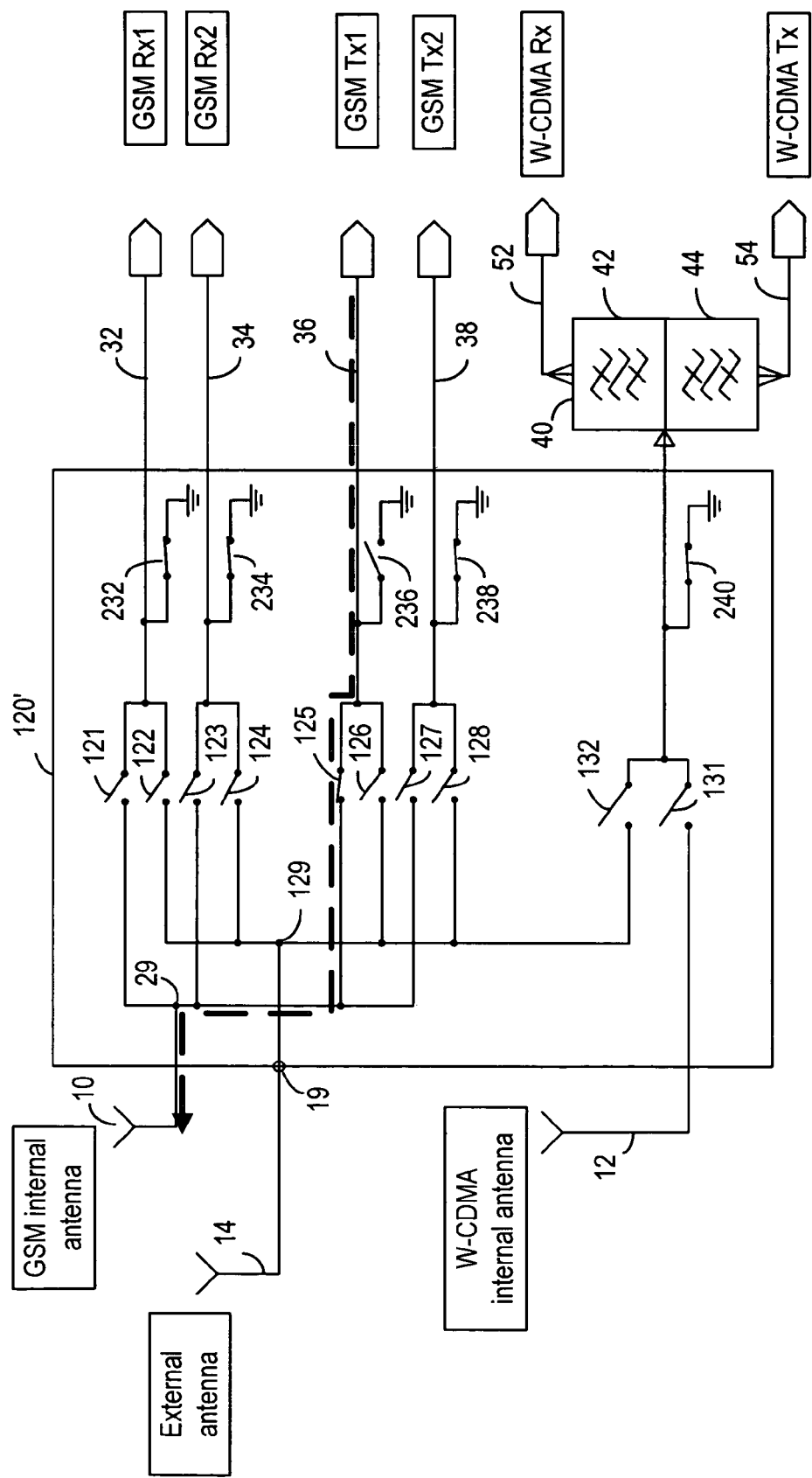
FIG. 4 is a schematic representation illustrating shunt switches being used to enhance performance.

The switching arrangement as shown in FIGS. 3a and 3b can be enhanced by adding shunt elements in the signal paths. For example, each of the transmit and receive ports can be connected to a shunt switch as shown in FIG. 4. As shown, shunt switches 232, 234, 236, 238 and 240 are separately connected to the signal paths 32, 34, 36, 38 and the duplexer 40. The shunt switches improve the isolation between the selected path and the non-selected paths.

Figure 5:
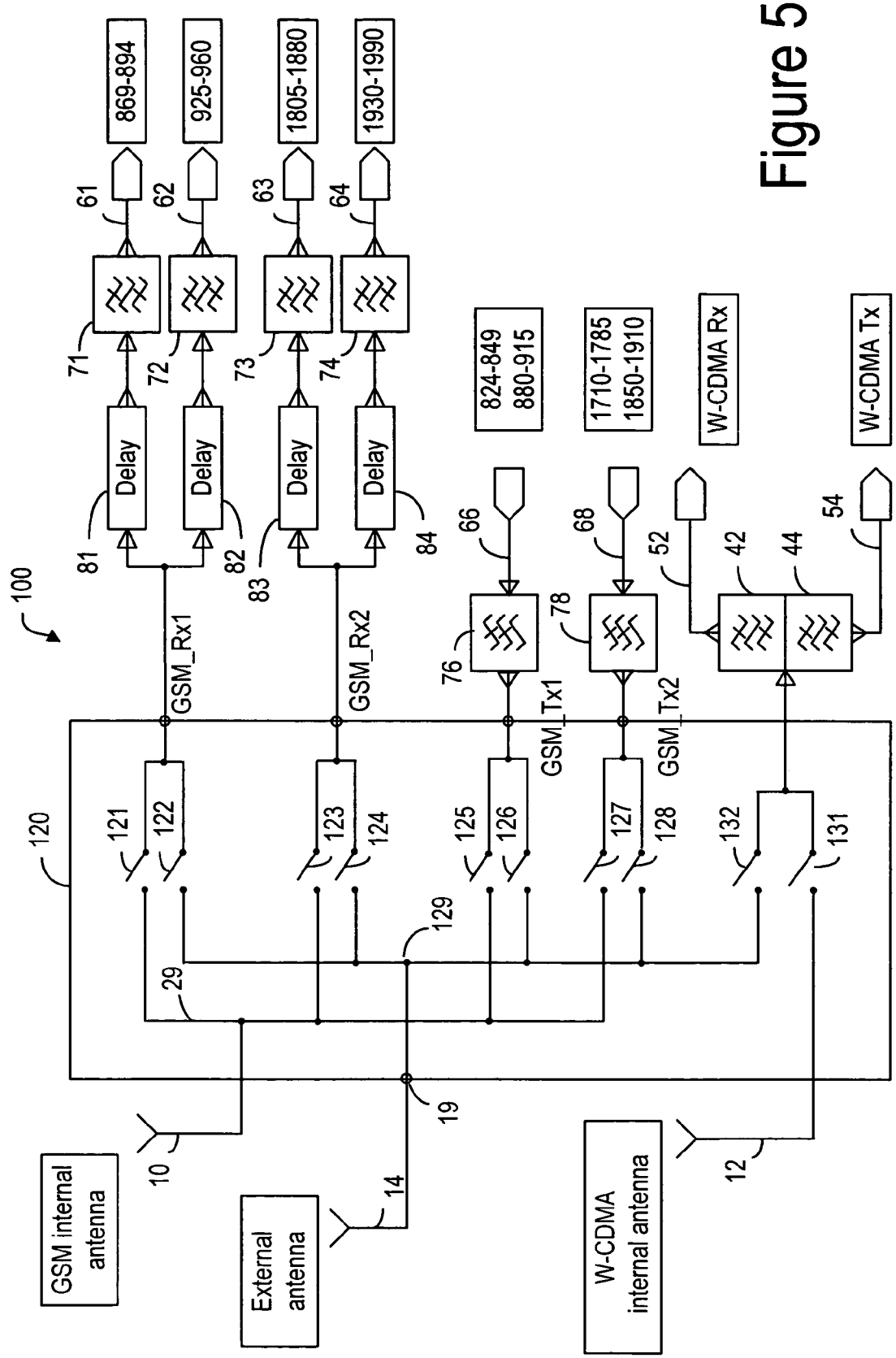
FIG. 5 is a schematic representation illustrating a quad-band GSM+WCDMA front-end operatively connected to the antenna switch part, according to the present invention.

In a quad-band GSM+W-CDMA front end, additional filters are needed and additional phase shifting elements for matching purposes may also be needed. As shown in FIG. 5, the GSM Rx1 signal path 32 is used for both GSM Rx (869-894 MHz) and GSM Rx (925-960 MHz). A phase shifting element 81 and a bandpass filter 71 are connected to port 61 in series, and a phase shifting element 82 and a bandpass filter 72 are connected to port 62 in series. Likewise, a phase shifting element 83 and a bandpass filter 73 are connected to port 63 in series, and a phase shifting element 84 and a bandpass filter 74 are connected to port 64 is series. A low-pass filter 76 is used for frequency filtering in the GSM Tx1 port 66. A low-pass filter 78 is used for frequency filtering in the GSM Tx2 port 68. In FIG. 5, two lower-band GSM Rx filters are matched to one switch node (GSM Rx1), hence the phase shifting elements. Similarly, two upper-band GSM Rx filters are matched to another switch node (GSM Rx2). This allows saving in the total number of switches. However, it is possible to have a dedicated Rx switch for each band, if so desired. It is also possible to match three or more filters to a single node, provided that the frequency separation is large enough.

Figure 6:
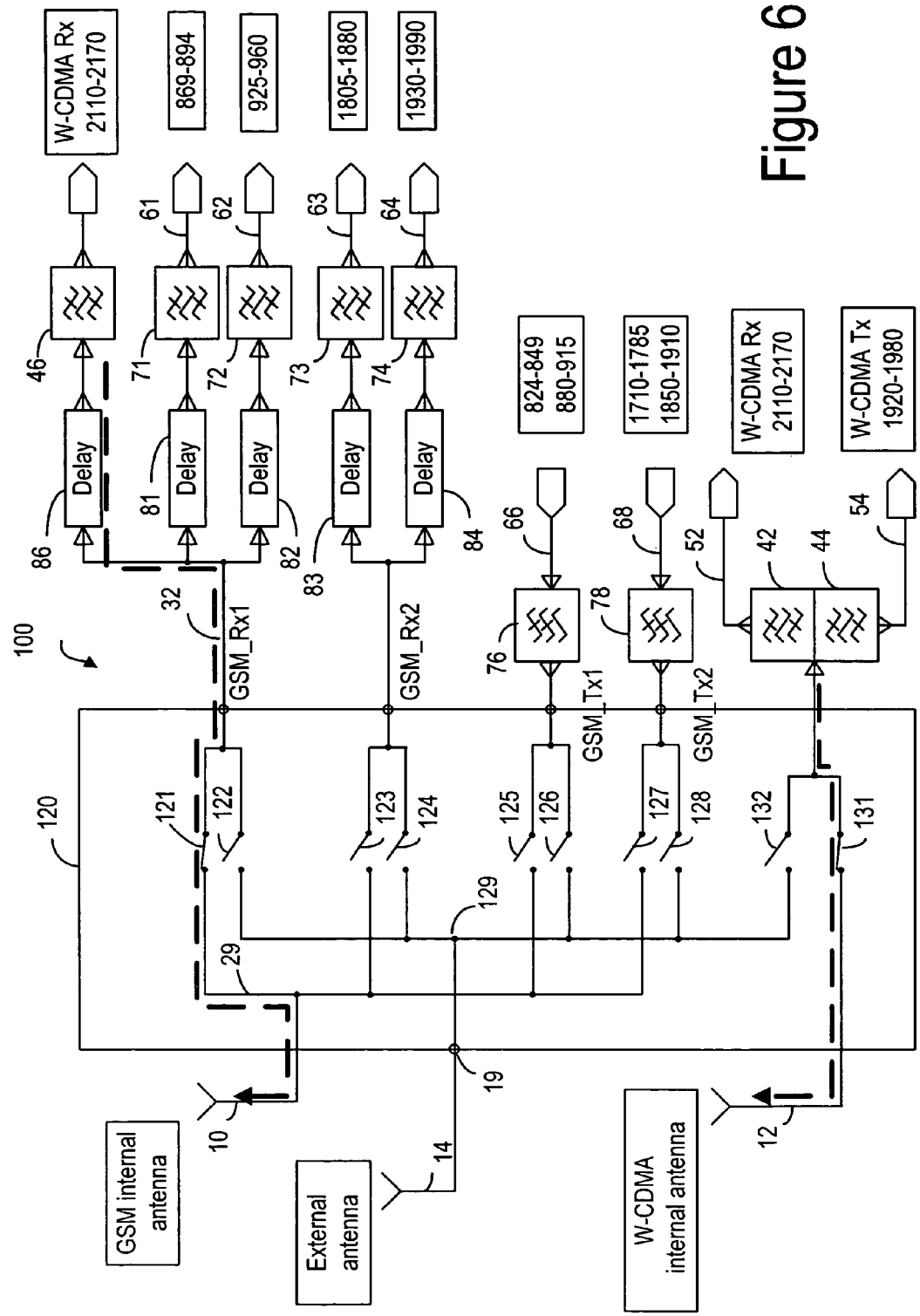
FIG. 6 is a schematic representation illustrating a W-CDMA Rx path being added to the quad-band GSM+WCDMA front end for MIMO reception purposes.

Additionally, a W-CDMA Rx path can be connected to the GSM Rx path for MIMO reception through a different internal antenna. As shown in FIG. 6, a phase shift element 86 and a bandpass filter 46 is connected between the GSM Rx1 path 32 and a W-CDMA (2110-2170 MHz) Rx port.

As illustrated in FIGS. 3a-6, the switching between internal and external antennas can be achieved without suffering from losses due to additional series switching elements in the GSM signal paths. In each of the multiband RF front-end arrangements, including dual-band GSM and quad-band GSM in combination with W-CDMA or MIMO W-CDMA reception, each signal path has only one series switch to facilitate selecting between internal and external antennas. When the mobile phone is used as a stand-alone handset, the switch arrangement, according to the present invention, is effectively the same as a prior art arrangement, except for the W-CDMA paths.

In sum, the present invention provides an antenna switch part for use in conjunction with an RF front-end of a communications device. Taking FIG. 3a for example, the front-end 100 has a plurality of signal paths 32, 34, 36, 38 for conveying signals in a plurality of frequency bands GSM Rx1, Rx2, Tx1, Tx2, through a first antenna 10 or a second antenna 14, wherein the frequency gap between GSM transmit frequency bands or the frequency gap between GSM receive frequency bands is at least 300 MHz, the antenna switch part comprising:

a plurality of first switching elements 121, 123, 125, 127, each switching element having a first end and a second end, each first switching element operable in an open position for electrically isolating the first end from the second end and in a closed position for electrically connecting the first end to the second end, the first end operatively connected to a first antenna 10, the second end operatively connected to a different one of the signal paths 32, 34, 36 and 38; and a plurality of second switching elements 122, 124, 126, 128, each switching element having a first end and a second end, each first switching element operable in an open position for electrically isolating the first end from the second end and in a closed position for electrically connecting the first end and the second end, the first end operatively connected to a second antenna 14, the second end operatively connected to the second end of a different one of the first switching elements 121, 123, 125, 127, so that the signals in one of the plurality of signal paths can be routed through the first or the second antenna when the first or the second switching element connected to said one signal path is operated in the closed position. In FIG. 3c, the signals in the signal path 36 are routed through the first antenna 10 when the first switch 125 is operated in an "ON" state or a closed position. However, if the second switch 126, instead of the first switch 125, is operated in an "ON" state, the signals in the signal path 36 are routed through the second antenna 14. For providing further isolation between signal paths, each signal path can be connected to a shunt switch near at the port end.

It should be noted that the embodiments as shown in FIGS. 3a to 6 are mainly used to demonstrate how the antenna switch of the present invention is applicable to an RF front-end having a combination of GSM and WCDMA bands. However, the present invention is also applicable to the combination of GSM and CDMA bands, the combination of GSM and multiple CDMA bands or multiple WCDMA bands, for example. Furthermore, the MIMO path in FIG. 6 could be used for complementary wireless applications, such as WLAN, Bluetooth and GPS.

Figure 7:
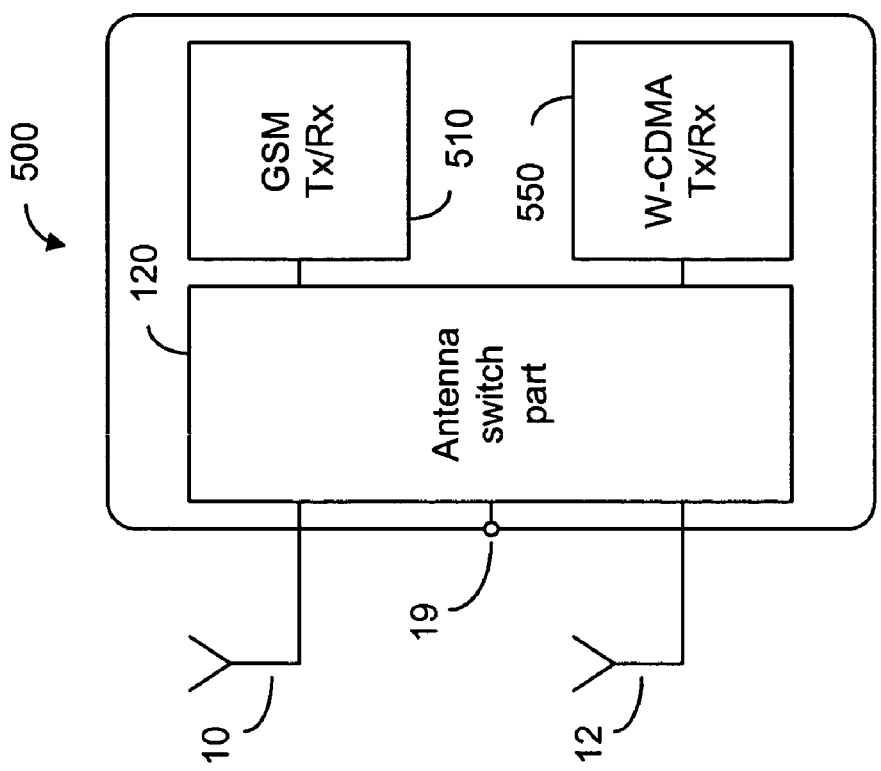
FIG. 7 is a schematic representation illustrating a communications device having an antenna switch part, according to the present invention.
Figure 1C:
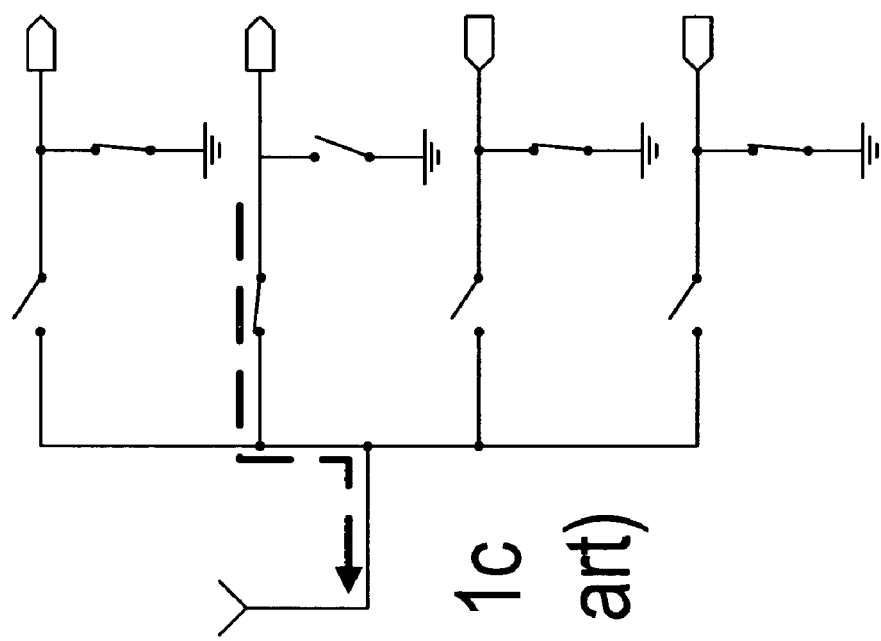
FIG. 1c is a schematic representation showing an FET-based SP4T antenna switch.
Figure 2:
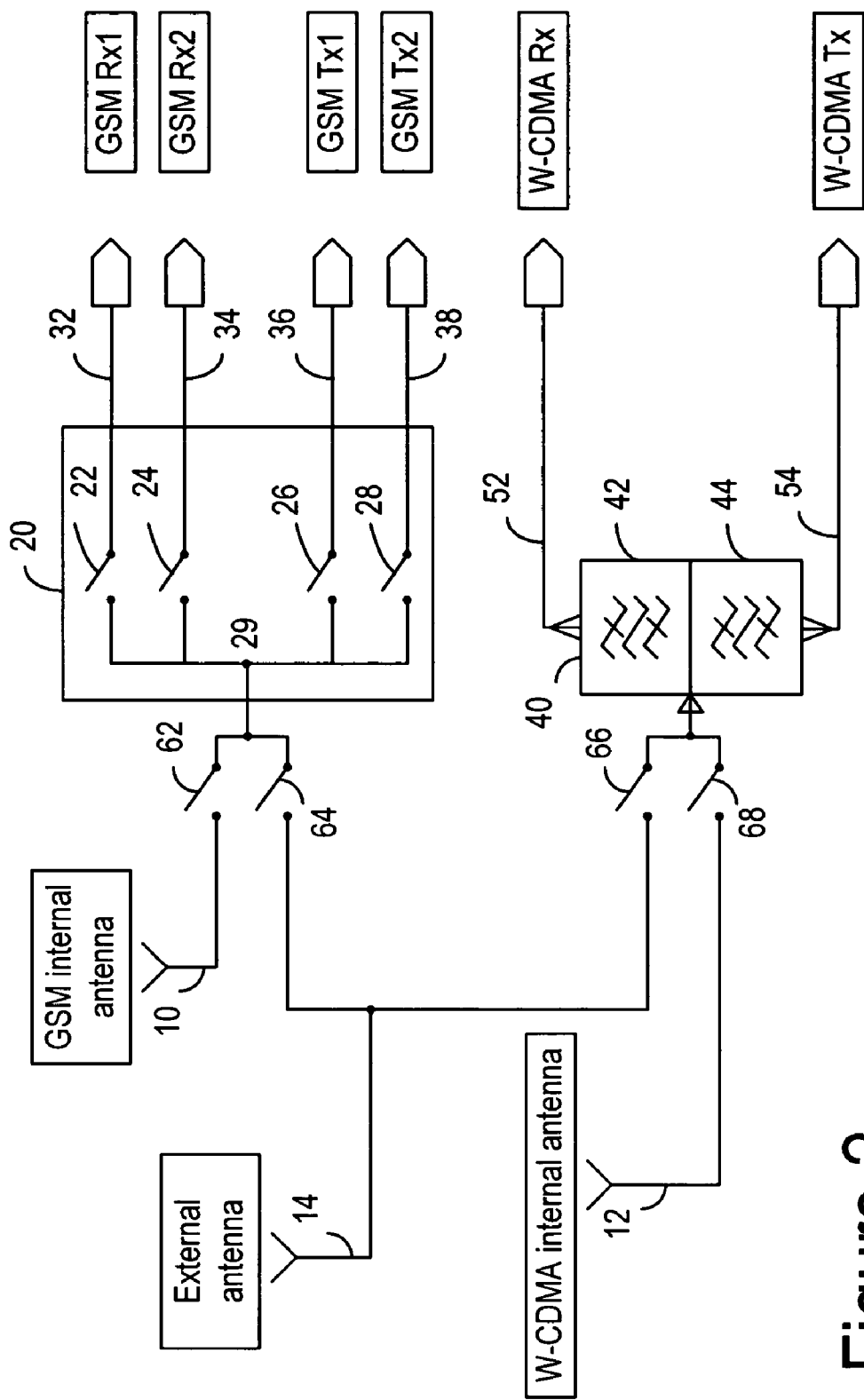
FIG. 2 is a schematic representation showing a prior art switch arrangement for selecting between internal and external antennas.

The switching arrangement as shown in FIGS. 3a to 6 can be used in a mobile terminal 500 or other communications devices as shown in FIG. 7. As shown in FIG. 7, the mobile terminal 500 has a first internal antenna 10 and a second internal antenna 12 operatively connected to an antenna switch part 120. The mobile terminal 500 also comprises a GSM transceiver 510 and a CDMA (or W-CDMA) transceiver 550. The GSM transceiver 510 has a plurality of signal paths operatively connected to the antenna switch part 120 in order to selectively convey signals in the GSM frequency bands to the first internal antenna 10. Likewise, the transceiver 550 has a plurality of signal paths operatively connected to the antenna switch part 120 in order to selectively convey signals in the code-division multiple access frequency bands to the second internal antenna 12. The mobile terminal 500 further comprises a connector 90 to allow an external antenna (not shown) to be operatively connected to the antenna switch part 120. When the second antenna is connected to the connector 19, one or more of the signal paths in the transceivers 510, 550 can be routed either to the internal antennas or the external antenna through the antenna switch part 120.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. An antenna switch part for use in conjunction with a radio frequency front-end of a communications device, wherein the front-end has a plurality of signal paths for conveying signals in a plurality of frequency bands according to a first protocol through a first antenna or a second antenna, the frequency bands including at least one transmit frequency band and one receive frequency band, and a further signal path for conveying signals in a frequency band according to a second protocol through the second antenna or a third antenna, said antenna switch part comprising:
   a plurality of first switching elements, each switching element having a first end a second end, the first switching elements operable in an open position for electrically isolating the first end from the second end and in a closed position for electrically connecting the first end to the second end, the first end operatively connected to the first antenna, the second end operatively connected to a different one of the signal paths;
   a plurality of second switching elements, each switching element having a first end and a second end, the second switching elements operable in an open position for electrically isolating the first end from the second end and in a closed position for electrically connecting the first end and the second end, the first end operatively connected to the second antenna, the second end operatively connected to the second end of a different one of the first switching elements, so that the signals in one of the plurality of signal paths can be routed through the first or the second antenna when the first or the second switching element connected to said one signal path is operated in the closed position; and
   a third switching element having a first end and a second end, the third switching element operable in an open position or a closed position, the first end operatively connected to the third antenna and the second end operatively connected to the further signal path, wherein the further signal path is also operatively connected to the second end of a different one of the second switching elements.

2. The antenna switch part of claim 1, wherein the frequency bands according to the first protocol also include one further transmit frequency band and one further receive frequency band.

3. The antenna switch part of claim 1 further comprising one or more shunt switches, each shunt switch having a first end connected a different one of the signal paths, and a second end connected to a circuit ground, each shunt switch operable in a closed position or in an open position, wherein the shunt switch, if any, connected to said one signal path is operated in the open position.

4. The antenna switch part of claim 1 further comprising a plurality shunt switches, each shunt switch having a first end connected a different one of the signal paths, and a second end connected to a circuit ground, each shunt switch operable in a closed position or in an open position, wherein the shunt switch connected to said one signal path is operated in the open position and the shunt switch connected to each of the other signal paths is operated in the closed position.

5. The antenna switch part of claim 1, wherein the communications device comprises a mobile terminal.

6. The antenna switch part of claim 1, wherein the protocol is Global System for Mobile Communications (GSM) protocol.

7. The antenna switch part of claim 1, wherein the second protocol is Code Division Multiple Access (CDMA) protocol.

8. The antenna switch part of claim 7, wherein the code-division multiple access frequency band comprises a wideband code division multiple access (W-CDMA) frequency band.

9. A method for selecting a signal path among a plurality of signal paths in a radio frequency front-end of a communications device, wherein the communications device comprises a first antenna, a second antenna and a third antenna, wherein the signal paths are used to convey signals in a plurality of frequency bands including at least one transmit frequency band and one receive frequency band according to a first protocol through the first antenna or the second antenna, and wherein a further signal path is used to convey signals in a frequency band according to a second protocol through the second antenna and the third antenna, said method comprising:
   providing a plurality of first switching elements, each first switching element having a first end a second end, the first switching elements operable in an open position for electrically isolating the first end from the second end and in a closed position for electrically connecting the first end to the second end, the first end operatively connected to the first antenna, the second end operatively connected to a different one of the signal paths;
   providing a plurality of second switching elements, each second switching element having a first end and a second end, the second switching elements operable in an open position for electrically isolating the first end from the second end and in a closed position for electrically connecting the first end and the second end, the first end operatively connected to the second antenna, the second end operatively connected to the second end of a different one of the first switching elements;
   providing a third switching element having a first end and a second end, the third switching element operable in an open position or in a closed position, the first end operatively connected to the third antenna and the second end operatively connected to the further signal path, wherein the further signal path is also operatively connected to the second end of a different one of the second switching elements;
   causing either the first or the second switching element connected to the selected signal path to operate in the closed position for routing the signals in the selected signal path through the first antenna or the second antenna; and
   causing the third switching element to operate in the closed position for routing the signals in the further signal path through the third antenna, if so desired.

10. The method of claim 9, wherein the selected signal path is also used for conveying signals in the frequency band according to the second protocol, and wherein the first switching element connected to the selected signal path is caused to operate in the closed position so as to route the signals in the frequency band according to the second protocol also through the first antenna to achieve receive diversity.

11. The method of claim 9, wherein the first protocol is Global System for Mobile Communications (GSM) protocol.

12. The method of claim 9, wherein the protocol is Code Division Multiple Access (CDMA) protocol.

13. A communications device, comprising:
a radio frequency front-end;
an antenna switch part;
a first antenna operatively connected to the radio frequency front-end through the antenna switch part;
a connector to allow a second antenna to operatively connected to the radio frequency front-end through the antenna switch part; wherein the front-end has a plurality of signal paths for conveying signals in a plurality of frequency bands according to a first protocol through the first antenna or the second antenna, the frequency bands including at least one transmit frequency band and one receive frequency band, and a further signal path for conveying signals in a frequency band according to a second protocol through the second antenna or a third antenna, and wherein the antenna switch part comprises:
a plurality of first switching elements, each switching element having a first end a second end, the first switching elements operable in an open position for electrically isolating the first end from the second end and in a closed position for electrically connecting the first end to the second end, the first end operatively connected to the first antenna, the second end operatively connected to a different one of the signal paths;
a plurality of second switching elements, each switching element having a first end and a second end, the second switching elements operable in an open position for electrically isolating the first end from the second end and in a closed position for electrically connecting the first end and the second end, the first end operatively connected to the second antenna, the second end operatively connected to the second end of a different one of the first switching elements, so that the signals in one of the plurality of signal paths can be routed through the first or the second antenna when the first or the second switching element connected to said one signal path is operated in the closed position; and
a third switching element having a first end and a second end, the third switching element operable in an open position or a closed position, the first end operatively connected to the third antenna and the second end operatively connected to the further signal path, wherein the further signal path is also operatively connected to the second end of a different one of the second switching elements.

14. The communications device of claim 13, wherein the frequency bands according to the first protocol also include one further transmit frequency band and one further receive frequency band.

15. The communications device of claim 13, wherein the antenna switch part further comprises one or more shunt switches, each shunt switch having a first end connected a different one of the signal paths, and a second end connected to a circuit ground, each shunt switch operable in a closed position or in an open position, and wherein the shunt switch, if any, connected to said one signal path is operated in the open position.

16. The communications device of claim 13, wherein the antenna switch part further comprises a plurality shunt switches, each shunt switch having a first end connected a different one of the signal paths, and a second end connected to a circuit ground, each shunt switch operable in a closed position or in an open position, and wherein the shunt switch connected to said one signal path is operated in the open position and the shunt switch connected to each of the other signal paths is operated in the closed position.

17. The communications device of claim 13, comprising a mobile terminal.

18. The communication device of claim 13, wherein the first protocol is Global System for Mobile Communications (GSM) protocol.

19. The communications device of claim 18, wherein the GSM and the further GSM frequency bands include 1GSM Rx, 2GSM Rx, 1GSM Tx and 2GSM Tx.

20. The communications device of claim 13, wherein the second protocol is Code Division Multiple Access (CDMA) protocol.

21. The communications device of claim 20, wherein the code-division multiple access frequency band comprises a wideband code division multiple access frequency band.

22. The communications device of claim 21, wherein the wideband code division multiple access frequency band includes a receive frequency band substantially between 2110 and 2170 MHz, and a transmit frequency band substantially between 1920 and 1980 MHz.

* * * * *

UNITED STATES PATENT AND TRADEMARK OFFICE
CERTIFICATE OF CORRECTION

PATENT NO. : 7,251,499 B2 Page 1 of 1
APPLICATION NO. : 10/871791
DATED : July 31, 2007
INVENTOR(S) : Ellä et al.

It is certified that error appears in the above-identified patent and that said Letters Patent is hereby corrected as shown below:

Column 11, line 4, claim 12, line 1, after "the", --second-- should be inserted.

Signed and Sealed this

First Day of April, 2008

JON W. DUDAS
*Director of the United States Patent and Trademark Office*